United States Patent [19]

Jones et al.

[11] Patent Number: 4,854,115
[45] Date of Patent: Aug. 8, 1989

[54] APPARATUS FOR CUTTING GRASS AND THE LIKE

[75] Inventors: Dallas W. Jones, New Hartford; Lauren Young, Poland, both of N.Y.

[73] Assignee: Trim-A-Lawn Corporation, Utica, N.Y.

[21] Appl. No.: 245,969

[22] Filed: Sep. 16, 1988

Related U.S. Application Data

[63] Continuation of Ser. No. 80,269, Jul. 31, 1987, abandoned.

[51] Int. Cl.$^4$ ............................................. A01D 34/68
[52] U.S. Cl. .................................. 56/320.1; 56/12.7; 56/17.5
[58] Field of Search ...................... 56/255, 12.7, 17.4, 56/17.5, 320.2, 320.1

[56] References Cited

U.S. PATENT DOCUMENTS

| | | | |
|---|---|---|---|
| 3,208,209 | 9/1965 | Dunlap | 56/295 |
| 3,391,524 | 7/1968 | Nickoloff et al. | 56/320.2 |
| 3,496,707 | 2/1970 | Kobey | 56/17.5 |
| 3,805,499 | 4/1974 | Woelffer et al. | 56/320.2 |
| 3,988,810 | 11/1976 | Emery | 24/128 |
| 4,054,992 | 10/1977 | Ballas | 30/276 |
| 4,107,907 | 8/1978 | Rutherford | 56/320.2 |
| 4,126,990 | 11/1978 | Fisher | 56/295 |
| 4,187,598 | 2/1980 | Pittinger | 29/513 |
| 4,232,505 | 11/1980 | Walto | 56/320.1 |
| 4,295,324 | 10/1981 | Frantello | 56/12.7 |
| 4,357,789 | 11/1982 | Rodish | 56/295 |
| 4,362,007 | 12/1982 | Kennedy | 56/295 |
| 4,378,668 | 5/1983 | Gullett | 56/255 |
| 4,466,235 | 8/1984 | Cole | 56/175 |
| 4,513,563 | 4/1985 | Roser | 56/295 |
| 4,711,077 | 12/1987 | Kutsukake | 56/255 |

FOREIGN PATENT DOCUMENTS

| | | |
|---|---|---|
| 2556553 | 6/1977 | Fed. Rep. of Germany . |
| 103277 | 2/1924 | France . |
| 2282783 | 3/1976 | France . |

Primary Examiner—John Weiss
Attorney, Agent, or Firm—Shlesinger & Myers

[57] ABSTRACT

An apparatus that can be readily converted from a lawnmower to a trimmer including a housing, an engine mounted thereon, a plurality of wheels rotatably mounted to the housing, a handle secured to the housing and a control linkage system. The housing includes a main body portion and an adjustable segment. The adjustable segment is pivotally connected to the main body of the housing. The adjustable segment is further spring biased in a first position wherein the apparatus is in the traditional lawnmower mode. The control linkage system is operably associated with the adjustable segment so that upon depression of a control lever the adjustable segment pivots upwardly and exposes a portion of the blade. The exposed portion of the blade extends several inches outwardly from the outermost portion of the apparatus. Therefore, the apparatus is able to effectively trim grass from around obstacles such as trees, fences, and posts. An operator need only release the control lever to resume the normal lawnmower cutting operaiton.

25 Claims, 2 Drawing Sheets

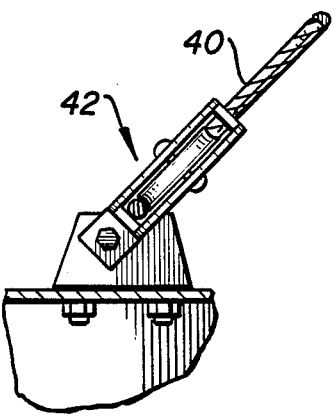
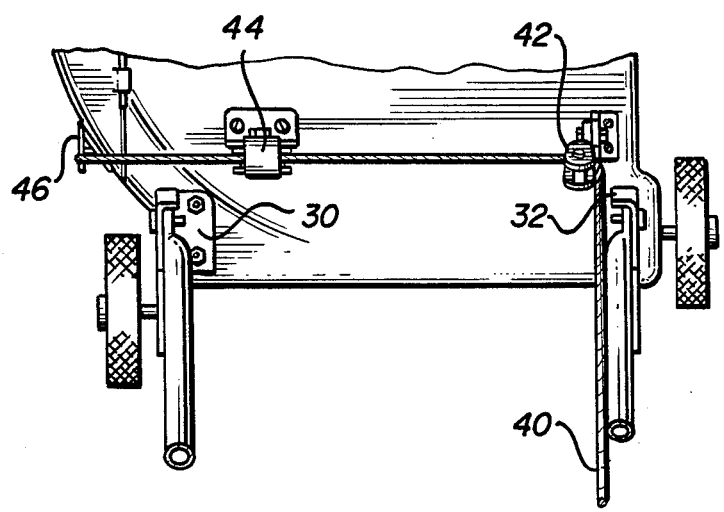
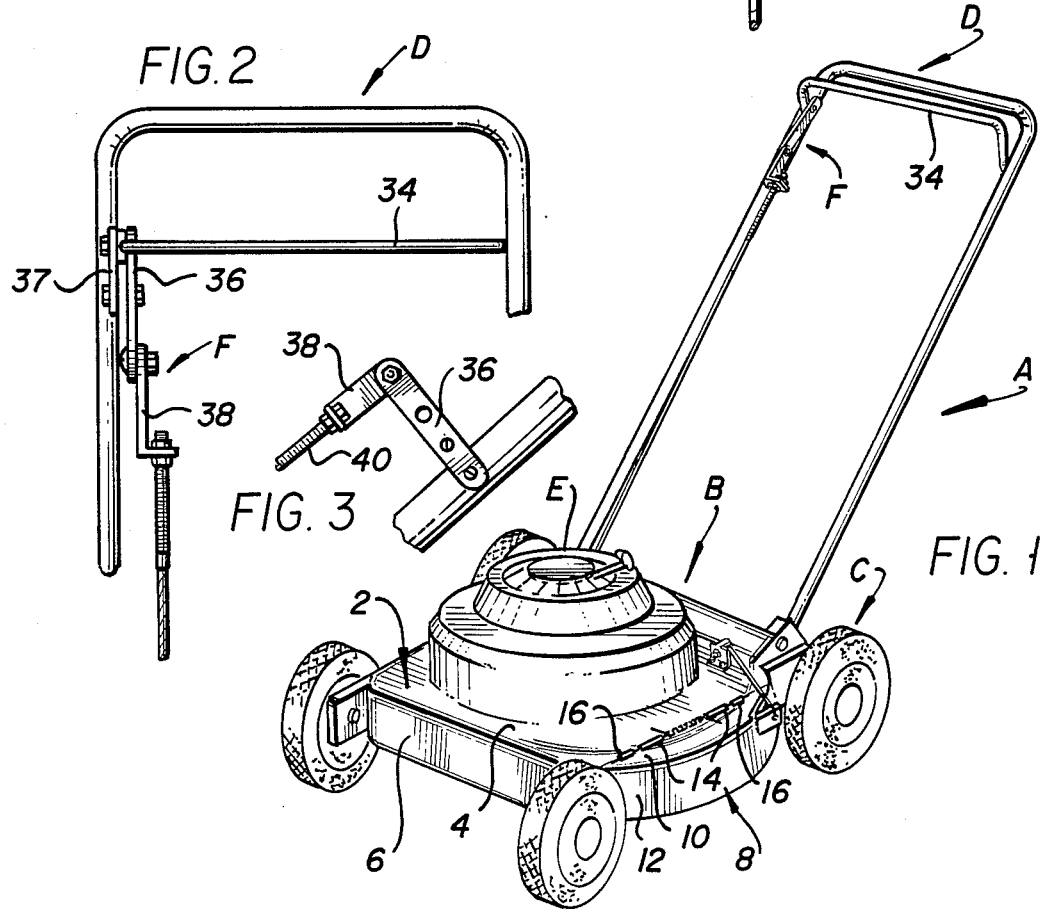

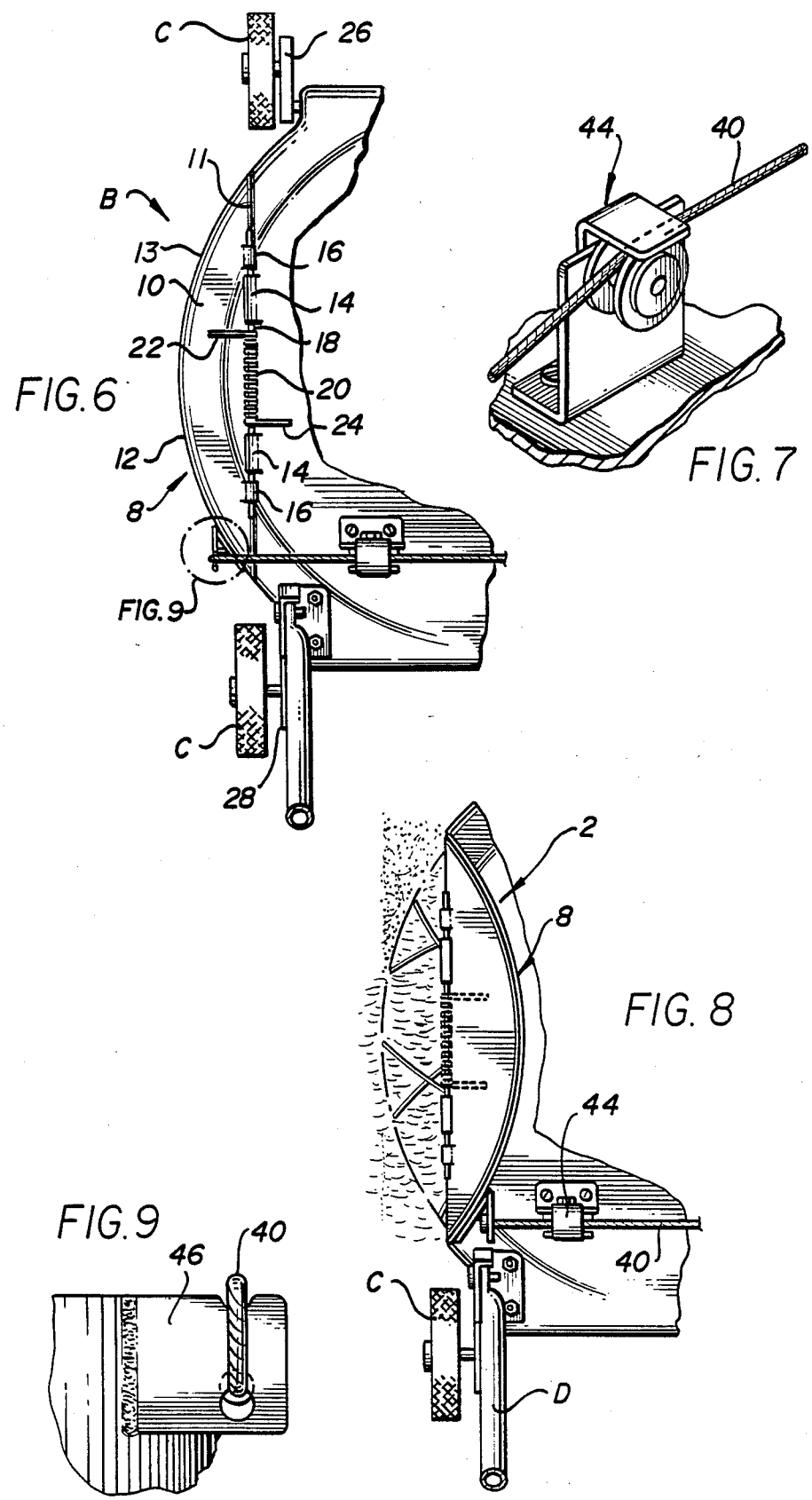

APPARATUS FOR CUTTING GRASS AND THE LIKE

This application is a continuation of application Ser. No. 080,269, filed July 31, 1987, now abandoned.

FIELD OF THE INVENTION

This invention pertains to apparatuses for cutting and trimming grass and the like.

BACKGROUND OF THE INVENTION

A number of devices have been proposed for cutting grass and the like. The conventional mowers used by consumers have a significant drawback in that they are unable to effectively cut grass from around trees, fences, posts and similar obstacles. Thus, either the grass around these obstacles remains uncut or the operator of the mower must remove the grass by hand or by a power trimmer. Neither of these alternatives are desirable. Of course, if the grass around the aforementioned obstacles is left to grow it will significantly detract from the appearance of the dwelling either residential or commercial. Further, the tall grass around the obstacles provide an ideal nesting place for insects and infectious animals. If the operator is required to remove the grass by hand or a power trimmer, he must shut down the lawnmower and then proceed to remove the grass around the obstacle by hand or a well known garden tool. This is a very time consuming process and significantly prolongs the laborious task of cutting the grass.

Prior to the present invention, it has not been known to provide a single apparatus with the capability of effectively cutting grass and trimming around obstacles commonly found around residential or commercial buildings.

OBJECTS AND SUMMARY OF THE INVENTION

An object of the present invention is to provide an improved apparatus for cutting grass and the like.

Another object of the present invention is to provide an apparatus that can effectively cut grass and trim around obstacles such as fences, light posts, trees and the like.

A further object of the present invention is to provide an apparatus that can be readily converted from a lawnmower to a trimmer.

Still a further object of the present invention is to provide an apparatus that can be converted from a lawnmower to a trimmer without bringing the apparatus to a halt.

Yet another object of the present invention is to provide an apparatus that can readily trim grass and the like around obstacles such as fences, lamp posts, trees, and the like without damaging the cutting blade or the obstacle.

Another object of the present invention is to provide an apparatus that can be readily converted from a lawnmower to a trimmer by activating a lever positioned adjacent the handle.

A further object of the present invention is to provide a riding lawnmower that can be readily converted to a trimmer.

These and other objects will become readily apparent upon review of the present disclosure.

In summary, the present invention discloses an apparatus that can cut grass in open fields and trim around trees, fences, posts and the like.

DESCRIPTION OF THE DRAWINGS

FIG. 1 is a perspective view of the lawnmower formed in accordance with the present invention.

FIG. 2 is a fragmentary plan view of the handle of the lawnmower formed in accordance with the present invention.

FIG. 3 is a fragmentary side elevational view of the control linkage formed in accordance with the present invention.

FIG. 4 is a fragmentary plan view of the rear portion of the lawnmower housing formed in accordance with the present invention.

FIG. 5 is a side elevational view of a portion of the control linkage formed in accordance with the present invention.

FIG. 6 is a fragmentary plan view of the lawnmower housing in the open field cutting position.

FIG. 7 is a fragmentary perspective view of another portion of the control linkage.

FIG. 8 is a fragmentary plan view of the lawnmower housing in the trimming position.

FIG. 9 is an exploded view of a section taken from FIG. 6.

DETAILED DESCRIPTION OF THE INVENTION

FIGS. 1-8

Referring to FIG. 1, the lawnmower A includes a housing B, a plurality of wheels C rotatably mounted to housing B, a handle D, a motor E and a control linkage system F. The housing B includes a main body portion 2 having a substantially planar upper surface 4 and a skirt 6. The upper surface 4 of housing B includes mounting elements (not shown) for mounting the motor E on housing B. The upper surface 4 extends substantially parallel to the ground when the lawnmower A is in operation. The skirt 6 extends along the outer circumference of the upper surface 4. Further, skirt 4 extends downwardly from upper surface 4 and forms substantially a right angle therewith.

Referring to FIG. 6, the housing B further includes an adjustable segment 8 having an upper surface 10 and a skirt 12. The upper surface 10 is bounded by a chord 11 and an arc 13. The adjustable segment 8 is pivotally connected to the main body portion 2 of housing B. More specifically, main body portion 2 and adjustable segment 8 include a pair of connecting hinges 14 and 16 respectively. Hinges 14 are positioned inside of hinges 16. A rod or hinge pin 18 is inserted through hinges 14 and 16 for pivotally connecting the adjustable segment 8 to the main body portion 2. A spring 20 is disposed intermediate hinges 14. The spring 20 includes first and second ends 22 and 24 respectively. First end 22 extends at substantially a right angle with rod 18 and rests on upper surface 10 of adjustable segment 8. Similarly, second end 24 extends at substantially a right angle with rod 18 and rests on upper surface 4 of main body portion 2. The spring 8 acts to bias segment 8 in the open field cutting position best seen in FIG. 6.

Housing B includes first and second brackets 26 and 28. Wheels C adjacent adjustable segment 8 are rotatably mounted to the housing B via brackets 26 and 28. The brackets 26 and 28 mount wheels C such that they are positioned inwardly of the innermost portion of adjustable segment 8. Further, the brackets 26 and 28 position front and rear wheels C forwardly and rearwardly respectively of the corresponding wheels C positioned on the opposite side of housing B.

Referring to FIGS. 1 and 2, the handle D is substantially U-shaped. The handle D is mounted to the upper surface 4 of main body portion 2 via brackets 30 and 32. The control linkage system F is operably connected to and extends along handle D. The control linkage system F includes a hand grip lever 34, brackets 36 and 38, a cable 40 and a directional pulley 42 and a guide pulley 44. Hand grip lever 34 is pivotally connected to handle D. Bracket 36 is fixed at one end to handle grip lever 34 via bracket 37. Bracket 37 prevents bracket 38 from rotating about handle D. Bracket 38 is swivelly connected at one end to bracket 36. Bracket 38 is connected at one opposite end to cable 40. Cable 40 extends along one arm of the handle D and is fed through directional pulley 42 as best seen in FIG. 4. Cable 40 is subsequently fed through guide pulley 44 and is secured to bracket 46 extending from adjustable segment 8, best seen in FIG. 9.

The hand grip lever 34 is displaced between an operating position (not shown) and a storage position best seen in FIG. 6. In the operating position, hand grip lever 34 lies in substantially the same plane as the handle D. Further, as seen in FIG. 3, the bracket 36 extends substantially perpendicular to handle D and bracket 38. In the storage position, the hand grip lever 34 forms an acute angle with the plane that handle D lies in. Additionally brackets 36 and 38 extend generally parallel to handle D.

Operation

The operation of the lawnmower A will now be described with reference being had to FIGS. 1-9. The lawnmower A has two states of operation. The first is the normal cutting mode wherein the lawnmower A is used to cut grass in open areas. During this period of operation, the hand grip lever 34 is in the position shown in FIG. 1. The operator need merely grip handle D and push the lawnmower across the specific area to be cut.

In the second mode of operation, the lawnmower A is readily converted into a trimmer without requiring the operator to halt the lawnmower. This mode enables the operator to trim the grass around obstacles such as trees, fences, posts and the like. To convert the lawnmower A to a trimmer, the operator need only press handle grip lever 34 so that it lies in substantially the same plane as handle D. This results in bracket 36 pivoting upwardly to form an acute angle with the arms of handle D. As a result, the cable 40 is displaced upwardly towards the operator and thereby raises adjustable segment 8 to expose a portion of the blade, as best seen in FIG. 8. Adjustable segment 8 is rotated about rod 18 greater than 90° so that the skirt 12 does not obstruct the movement of the lawnmower A around obstacles such as fences, trees, posts and the like. In the preferred embodiment, the adjustable segment 8 is rotated 180° so that upper surface 10 lies on upper surface 4. The force exerted on adjustable segment 8 to lift the same is transverse to the line of force exerted to depress lever 34. In the preferred embodiment, the blade for the lawnmower A is to be formed from flexible filaments of the type disclosed in U.S. Pat. No. 4,513,563 which is herein incorporated by reference. The wheels adjacent the adjustable segment 8 are positioned inwardly from the outermost extremity of the housing B. This arrangement permits the filaments of the blade to extend outwardly from the lawnmower A and thus enable it to act as a trimmer. As readily seen in FIG. 8, the grass between the obstacles shown in dotted line can readily be cut with the lawnmower of the present invention and thus the operator avoids later trimming of the same by hand or power-type gardening tools. Further, the section of main body portion 2 intermediate wheel C and adjacent adjustable segment 8 does not extend beyond the outer most surfaces of wheels C as shown in FIG. 6. This feature enables the operator, when the adjustable segment is in the raised position, to run wheels C directly up against obstacles such as fences and the like. Thus, the operator is able to trim weeds from remote areas.

Once the obstacles have been cleared and the operator desires to cut an open area he need merely release the hand grip lever 34. The ends 22 and 24 of spring 20 will bias the adjustable segment 8 into the position shown in FIG. 6. As a result, the cable 40 pulls on lever 34 so that lever 34 rotates to the position shown in FIG. 1.

It can be readily seen from the above disclosure that the lawnmower A formed in accordance with the present invention can be readily converted from a traditional lawnmower operating mode to a trimming mode without requiring the operator to stop the lawnmower. The lawnmower of the present invention significantly reduces the time spent by an individual in performing the tedious task of cutting grass in areas such as residential and commercial buildings.

Although the invention has been disclosed in the conventional push type lawnmower, it is readily apparent that the invention can be employed on riding or similar types of powered motors.

While this invention has been described as having preferred design, it is understood that it is capable of further modifications, uses and/or adaptions of the invention following in general the principle of the invention and including such departures from the present disclosure as come within known or customary practice in the art to which the invention pertains, and as may be applied to the central features herein before set forth, and fall within the scope of the invention and of the limits of the appended claims.

We claim:

1. An apparatus for cutting grass and the like, comprising:
   (a) a housing including front, rear and sides;
   (b) a cutting means operably associated with said housing;
   (c) at least a front wheel and at least a rear wheel operably associated with one of said sides of said housing;
   (d) said front and rear wheels associated with said one of said sides of said housing each having inner and outer surfaces, said inner surfaces being positioned adjacent said housing and said outer surfaces being removed therefrom;
   (e) said housing including a main body portion and an adjustable portion on one of said side;
   (f) said adjustable portion being positioned intermediate said front and rear wheels;
   (g) means for displacing said adjustable portion between first and second positions;

(h) said housing including a shield for forming an impermeable shroud over and around said cutting means;

(i) said adjustable portion forming a part of said shield when said adjustable portion is in said first position;

(j) said adjustable portion exposing at least a portion of said cutting means and permitting said at least a portion of said cutting means to extend beyond said outer surfaces of said front and rear wheels when said adjustable portion is in said second position;

(k) said main body portion of said housing intermediate said front and rear wheels extending a distance outwardly not to exceed the outer surfaces of said front and rear wheels; and (l) said adjustable portion extending outwardly from said outer surfaces of said front and rear wheels.

2. An apparatus as in claim 1, further including:
(a) means for biasing said adjustable portion in said first position.

3. An apparatus as in claim 1, further including:
(a) handle means operably associated with said housing; and
(b) said handle means is substantially U-shaped.

4. An apparatus as in claim 1, further including:
(a) means for pivotally connecting said adjustable portion to said main body portion.

5. An apparatus as in claim 4, wherein:
(a) said adjustable portion in said second position is rotated, by said displacement means, greater than 90° from said first position.

6. An apparatus as in claim 4, wherein:
(a) said adjustable portion in said second position is rotated, by said displacement means, substantially 180° from said first position.

7. An apparatus as in claim 3, wherein:
(a) said handle means includes a hand grip bar having first and second ends and first and second arms extending from said first and second ends respectively; and
(b) said first and second arms extend substantially parallel to each other.

8. An apparatus as in claim 7, wherein:
(a) said displacement means includes a lever; and
(b) said lever is positioned intermediate said left and right arms of said handle means and adjacent said hand grip bar; and
(c) said lever is substantially U-shaped.

9. An apparatus as in claim 8, wherein:
(a) said displacement means further includes cable means having first and second ends;
(b) said first end of said cable means is operably associated with said lever and said second end of said cable means is operably associated with said adjustable portion.

10. An apparatus as in claim 9, wherein:
(a) said first arm of said handle means is positioned adjacent said adjustable portion and said second arm is removed therefrom;
(b) said displacement means includes first and second pulley means;
(c) said first pulley means is positioned adjacent said first arm, said second pulley means is positioned adjacent said second arm; and
(d) said cable means is operably associated with said first and second pulley means.

11. An apparatus as in claim 1, wherein:
(a) said main body and said adjustable portion each include an upper surface and a skirt portion; and (b) said upper surface of said main body lies in substantially the same plane as said upper surface of said adjustable portion.

12. An apparatus for cutting grass and the like, comprising:
(a) a housing including front, rear, left and right sides;
(b) a cutting means operably associated with said housing;
(c) at least a front wheel and at least a rear wheel operably associated with one of said left and right sides of said housing;
(d) said housing including a main body portion and an adjustable portion;
(e) said adjustable portion being positioned adjacent said one of said left and right sides of said housing;
(f) said adjustable portion further being positioned intermediate said front and rear wheels;
(g) means for displacing said adjustable portion between first and second positions;
(h) said housing including a shield for forming an impermeable shroud over and around said cutting means;
(i) said adjustable portion forming a part of said shield when said adjustable portion is in said first position;
(j) said adjustable portion exposing at least a portion of said cutting means and permitting said at least a portion of said cutting means to extend beyond said outer surfaces of said front and rear wheels when said adjustable portion is in said second position;
(k) hinge means for pivotally connecting said adjustable portion to said main body portion; and
(l) said front and rear wheel being substantially aligned with the longitudinal axis of said hinge means.

13. An apparatus as in claim 12, further including:
(a) means for biasing said adjustable portion in said first position.

14. An apparatus as in claim 12, further including:
(a) handle means operably associated with said housing; and
(b) said handle means is substantially U-shaped.

15. An apparatus as in claim 12, wherein:
(a) said adjustable portion in said second position is rotated, by said displacement means, substantially 180° from said first position.

16. An apparatus as in claim 12, wherein:
(a) said adjustable portion in said second position is rotated, by said displacement means, greater than 90° from said first position.

17. An apparatus as in claim 14, wherein:
(a) said handle means includes a hand grip bar having a first and second ends and first and second arms extending from said first and second ends respectively; and
(b) said first and second arms extend substantially parallel to each other.

18. An apparatus as in claim 17, wherein:
(a) said displacement means includes a lever; and
(b) said lever is positioned intermediate said left and right arms of said handle means and adjacent said hand grip bar; and
(c) said lever is substantially U-shaped.

19. An apparatus in claim 18, wherein:
(a) said displacement means further includes a cable means having first and second ends;
(b) said first end of said cable means is operably associated with said lever and second second end of said cable means is operably associated with said adjustable portion.

20. An apparatus as in claim 19, wherein:
(a) said first arm of said handle means is positioned adjacent said adjustable portion and said second arm is removed therefrom;
(b) said displacement means includes first and second pulley means;
(c) said first pulley means is positioned adjacent said first arm, said second pulley means is positioned adjacent said second arm; and
(d) said cable means is operably associated with said first and second pulley means.

21. An apparatus as in claim 12, wherein:
(a) said main body and said adjustable portion each include an upper surface and a skirt portion; and
(b) said upper surface of said main body lies in substantially the same plane as said upper surface of said adjustable portion.

22. An apparatus as in claim 21, wherein:
(a) said upper surface of said adjustable portion includes a chord and an arc.

23. An apparatus as in claim 22, wherein:
(a) the pivotable axis of said hinge means lies substantially along said chord.

24. An apparatus as in claim 23, wherein:
(a) said skirt of said adjustable portion follows the curve of said arc.

25. An apparatus as in claim 22, wherein:
(a) at least a portion of said arc extends beyond said outer surfaces of said front and rear wheels when said adjustable portion is in said first position.

* * * * *